(12) United States Patent
Christ

(10) Patent No.: US 8,740,248 B2
(45) Date of Patent: Jun. 3, 2014

(54) SUPPORTING FOOT FOR VEHICLES

(75) Inventor: Armin Christ, Bessenbach (DE)

(73) Assignee: SAF-Holland, GmbH, Bessenbach (DE)

(*) Notice: Subject to any disclaimer, the term of this patent is extended or adjusted under 35 U.S.C. 154(b) by 67 days.

(21) Appl. No.: 13/148,226

(22) PCT Filed: Feb. 19, 2010

(86) PCT No.: PCT/EP2010/052091
§ 371 (c)(1),
(2), (4) Date: Aug. 5, 2011

(87) PCT Pub. No.: WO2010/100038
PCT Pub. Date: Sep. 10, 2010

(65) Prior Publication Data
US 2011/0291394 A1 Dec. 1, 2011

(30) Foreign Application Priority Data
Mar. 3, 2009 (DE) .......................... 10 2009 001 299

(51) Int. Cl.
*B60S 9/02* (2006.01)
(52) U.S. Cl.
USPC .................. 280/766.1; 280/763.1; 248/188.8
(58) Field of Classification Search
USPC ..................... 280/763.1, 764.1, 765.1, 766.1; 248/188.8, 188.9
See application file for complete search history.

(56) References Cited

U.S. PATENT DOCUMENTS

| | | | |
|---|---|---|---|
| 4,078,774 A | | 3/1978 | Williams |
| 5,137,301 A | * | 8/1992 | Muller et al. .............. 280/766.1 |
| 6,802,535 B1 | * | 10/2004 | Alguera Gallego et al. .......................... 280/763.1 |
| 8,186,717 B2 | * | 5/2012 | Alguera et al. ............ 280/763.1 |

FOREIGN PATENT DOCUMENTS

| | | |
|---|---|---|
| DE | 3642079 A1 | 6/1988 |
| DE | 3734073 A1 | 6/1988 |
| DE | 4003414 A1 | 8/1991 |
| DE | 202005002082 U1 | 5/2005 |
| GB | 2207102 A | 1/1989 |

OTHER PUBLICATIONS

International Search Report.

* cited by examiner

*Primary Examiner* — John Walters
(74) *Attorney, Agent, or Firm* — Price Heneveld LLP

(57) ABSTRACT

A supporting foot for vehicles, such as semi-trailers or the like, comprising a foot element with a resting portion for resting on an underlying surface, and a compensating element for receiving a support unit and for compensating a positional offset of the supporting unit with regards to the foot element, wherein the support unit comprises a first supporting element and a second supporting element telescopingly coupled with the first supporting element, the second supporting element is movable between a first and a second position with respect to the first supporting element, and wherein the first supporting element is in engagement with the foot element when the second supporting element is in the second position.

19 Claims, 3 Drawing Sheets

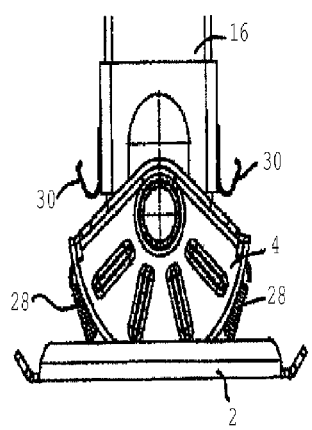
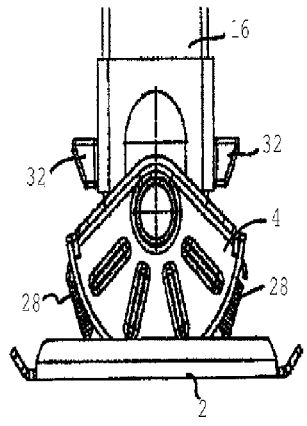
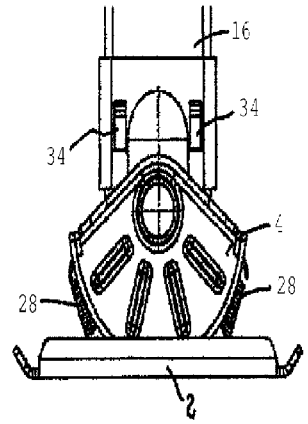
Fig. 4a   Fig. 5a   Fig. 6a
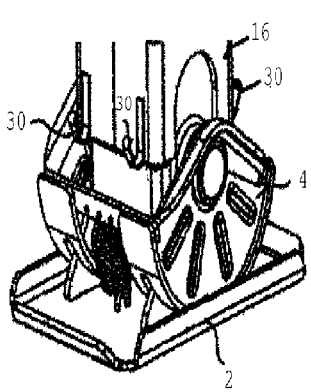
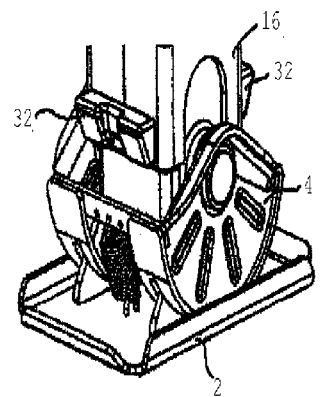
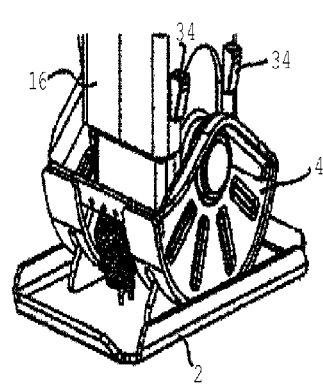
Fig. 4b   Fig. 5b   Fig. 6b

SUPPORTING FOOT FOR VEHICLES

BACKGROUND OF THE INVENTION

The present invention relates to a supporting foot or landing gear for vehicles, such as semi-trailers or the like, comprising at the lower end of an extendable support unit a supporting foot which can be swiveled and which is adapted to compensate an offset of the position of the vehicle.

Supporting feet for compensating a positional offset are well-known in the prior art. Such supporting devices are arranged in pairs at the front bottom-side of semi-trailers, for example, and are employed when the semi-trailer is parked separate from the truck-trailer. In the case of longer parking times, leaks in the brake and air-spring systems cause the rear part of the semi-trailer to lower and, due to the locked parking brake of the mechanical axle suspension, the vehicle or the semi-trailer, respectively, moves forward. In this situation, the supporting devices or the supporting units and supporting tubes thereof, respectively, are subject to bending and buckling stresses which might cause damage to or failure of the supports. In order to be able to compensate this positional offset, supporting feet have been developed which are arranged in such a way that they can be swiveled or moved horizontally. For example, DE 40 03 414 discloses a supporting foot which comprises a swivel-supported roller segment and a foot plate, wherein the roller segment can be rolled along on the foot plate. However, a problem of such supporting feet is that, in the retracted state (travel operation), they cause clattering noises due to the separate elements and, in addition, due to the frequent minimal movements of the elements relative to each other, wear on the parts results, without the supporting foot having brought been into its operative condition.

Therefore, the object underlying the present invention is to provide a supporting foot for vehicles, such as semi-trailers or the like, as well as a method of actuating a supporting foot for vehicles, such as semi-trailers or the like, by means of which clattering noises during the travel operation may be reduced or prevented and by means of which the wear on the components may be reduced.

SUMMARY OF THE INVENTION

According to the invention there is provided a supporting foot for vehicles, such as semi-trailers or the like, comprising a foot element with a resting portion for resting on an underlying surface, and a compensating element for receiving a support unit and for compensating a positional offset of the same, wherein the support unit is telescopic and comprises a first and a second supporting element, wherein the second supporting element can be moved between a first and a second position relative to the first supporting element, and wherein the first supporting element is in engagement with the foot element in the second position of the second supporting element. Thus, particularly expediently, the supporting foot is useful for vehicles or motor vehicles, and in particular for farm vehicles. For example, such vehicles are semi-trailers, which are drawn by a truck in order to transport heavy loads. Thus, in the case of a vehicle uncoupled from a truck, the supporting foot is provided in order to transmit to an underlying surface the force introduced from the frame of the vehicle via the foot element into the supporting foot. To this end, the foot element comprises a resting portion for resting on an underlying surface or ground. Said foot element absorbs the forces introduced from the frame of a vehicle into the supporting unit. Between the foot element and the supporting unit, there is provided a compensating element in order to balance or compensate a positional offset of the supporting unit relative to the foot element. The term "positional offset" may be understood to mean in particular the form of the change of the position in the linear direction (for example horizontally or in the longitudinal direction of the foot element). It is also possible to balance or compensate an angular offset of the supporting element relative to the foot element, wherein said angular offset may occur in particular in the longitudinal direction of the vehicle or essentially parallel to the swivel plane due to the curved rolling surface of the compensating element. Advantageously, the support unit comprises at least a first and a second supporting element. Expediently, said elements are telescopic along a displacement direction or a slide-in and slide-out direction or can be moved such that they can be fitted into each other or pass along each other or can be translatorily moved. Here, the first supporting element may be fixed essentially stationarily or frame-anchored or be fixed to the frame of the vehicle. Accordingly, the second supporting element can be moved along the displacement direction. Particularly advantageously, the first and the second supporting element may be arranged essentially concentrically relative to each other such that the second supporting element is arranged or can be arranged within the first supporting element. To put it differently, the second element may be slid into the first supporting element. The first and/or the second supporting element expediently may be tube-shaped. As a matter of course, it is also possible to provide more than two supporting elements which are telescopic. In the operational position of the supporting foot, the second supporting element is displaced to the first position relative to the first supporting element. To put it differently, the first and the second supporting element are moved apart such that the support unit has a greater length. In this position, the compensating element can advantageously compensate a relative movement of the foot element with respect to the support unit. In order to bring the vehicle into the travel operation, the second supporting element is displaced into a second position with respect to the first supporting element, in which position the support unit essentially has its smallest longitudinal extension. In the second position of the second supporting element, the first supporting element is in engagement or contact with the foot element or touches it. To put it differently, the first supporting element and the foot element are in engagement such that the foot element is fixed with respect to the support unit and, thus, cannot conduct a relative movement with respect to the support unit or the vehicle frame (in particular in the longitudinal direction of the foot element). To put it differently, the foot element is braced or clamped with the first supporting element of the support unit. As a result, it is particularly advantageously prevented that the foot plate causes clattering noises during the travel operation of the vehicle. Moreover, creeping wear due to minimal movements of the elements relative to each other is reduced by fixing the foot element. Expediently, the support unit is arranged at the compensating element such that it is connected therewith in such a way that it can be rotated or swiveled, in particular about a swivel axis along a swivel plane. Here, the connection may be such that the compensating element can be released from the support unit. The compensating element and the foot element may be arranged relative to each other between a first position or original position or zero position, in which the compensating element is arranged essentially centrally relative to the foot element, and a second position. Consequently, the second position is in particular a deflected position, wherein the compensating element particularly advantageously may be displaced—departing from the original position—both towards the front (front position) and towards the rear (rear position) (seen with respect to the foot element). Thus, the first position lies in particular between the front position and the rear position. Due to the fact that the compensating element can be rolled along on the foot element, the first position and the second positions are preferably located essentially along a straight line or a line or an axis or in a swivel plane, respectively. The resting portion of the foot element is advantageously designed essentially plate-shaped and may have an essentially rectangular shape with a longitudinal extension (longitudinal direction) which is larger than the width thereof. Expediently, the compensating element is swivel-supported, wherein the term "swivel-supported" is to be interpreted to mean that the compensating element may be moved relative to the foot element in such a manner that it can be swiveled. To this end, the compensating element has a swivel axis which expediently may essentially coincide with the bearing axis of the support unit. Expediently, the swivel axis is essentially perpendicular to the longitudinal extension or longitudinal axis of the foot element, or is essentially perpendicular to a plane in which lies the longitudinal extension or longitudinal axis of the foot element, respectively. The compensating element can be rolled along on a rolling portion of the foot element, which portion is preferably arranged essentially opposite of a side of the resting portion of the foot element facing the underlying surface. In order to ensure that the compensating element can be rolled along, the compensating element comprises a rolling surface which is curved along a swivel plane. Here, the swivel plane is essentially parallel to the longitudinal axis of the foot element or essentially perpendicular to the swivel axis of the compensating element, respectively. The curvature of the rolling surface may have any design. However, it is particularly advantageous that the curvature of the rolling surface is curvilinear or circular, i.e. not square or angular. Thus, the curvature of the compensating element along the swivel plane makes it possible for the compensating element to be rolled along on the foot element along the longitudinal extension or longitudinal axis thereof so as to compensate a positional offset of the vehicle in the longitudinal direction.

Advantageously, in the second position of the second supporting element, the first supporting element is in engagement with a guiding portion of the foot element, which guiding portion preferably is designed as a wall portion extending preferably essentially perpendicularly from the resting portion. Thus, the guiding portion may be a wall portion extending away from the resting portion and along the longitudinal axis or extension of the foot element. When employing only one guiding portion, said guiding portion is expediently arranged essentially in the center (seen in the transverse direction) at the foot element and, thus, particularly expediently protrudes at least partially into a recess of the rolling surface of the compensating element. However, particularly advantageously, there are provided two guiding portions which form side walls of the foot element and extend along the longitudinal extension of the foot element essentially perpendicularly to the resting portion, away from the same. Thus, the guiding portions serve for guiding the compensating element in the transverse direction, since the compensating element is arranged essentially between the guiding portions.

Particularly expediently, the guiding portion tapers towards the free end thereof. Thus, the guiding portion may have engagement surfaces or edges, respectively, for the contact with the first supporting element, which surfaces or edges are inclined relative to each other such that the guiding portion tapers towards the free end thereof (whereas the wall thickness remains the same). This ensures that, during the travel operation (i.e. in the second position of the second supporting element), the foot element automatically resumes its original or zero position.

Preferably, the first supporting element comprises a distal end portion, which, in the second position of the second supporting element, is in engagement with the foot element. To put it differently, the lower portion or the end face portion of the first supporting element can be made to engage with the foot element.

Advantageously, the first supporting element comprises a notch or a recess at a distal end portion, which notch is adapted to at least partially accommodate a swivel axis of the compensating element in the second position of the second supporting element. The swivel axis of the compensating element is in particular arranged such that it extends through a distal end portion of the second supporting element. In order to support the compensating element at the second supporting element in such a way that it can be swiveled, there may be provided corresponding bearing elements. The notch may be formed as a recess, an aperture or the like, which extends from an end face of the first supporting element into the same such that it may at least partially accommodate therein the swivel axis and corresponding bearing means. Here, the size of the notch is dimensioned such that, if the second supporting element is arranged in its second position, there is no contact or only little contact between the swivel axis or its elements (such as bearing elements), respectively, and the first supporting element so that it can be ensured that there is sufficient engagement between the first supporting element and the foot element.

In a further preferred embodiment, the second supporting element can also be moved into a third position relative to the first supporting element, in which third position the first supporting element may be made to engage with the compensating element and/or the swivel axis thereof, respectively. Thus, to put it differently, the second supporting element may be moved beyond the second position into a third position so that the second position is arranged between the first and the third position when there is a translatory movement or displacement of the supporting elements. As a result, in its third position, the second supporting element is slid furthest into the first supporting element. When the second supporting element is displaced into the second position, thus, the first supporting element comes to engage with the foot element. When the second supporting element is further moved into the third position, the foot element and the first supporting element continue to be in engagement, wherein additionally the first supporting element can be made to engage with the compensating element and/or the swivel axis thereof. This is possible because a shifting between the foot element and the compensating element in the direction of displacement is possible. As a result, it becomes particularly expediently possible to fix both the foot element and the compensating element so that it is even more efficiently possible to avoid clattering noises during the travel operation. It is possible to move or displace or shift the foot element towards the compensating element in the displacement direction since there is provided a pre-tensioning device, which may be formed as a spring, in order to pre-tension the compensating element in its original position relative to the foot element. This ensures that when the supporting foot is spaced apart from the ground (i.e. when the supporting foot is retracted during the travel operation), the compensating element may be brought into the basic position by means of the pre-tensioning device. Expediently, the pre-tensioning device is formed at least from one spring which is braced between the foot element and the compensating element, wherein the spring may in particular be arranged at the resting portion of the foot element. As a matter of course, there may also be provided a plurality of springs. For example, there may be provided two springs which—seen in the longitudinal direction of the resting portion—are arranged or fixed at the front and at the rear of the resting portion, respectively, and, accordingly, are attached at the front and at the rear at the edge portions of the compensating element. Expediently, the springs are coil springs and releasably arranged at the foot element and at the compensating element in order to ensure that they can be easily replaced. When the compensating element is swiveled, the springs may accordingly at least partially be accommodated in a recess of the compensating element.

It is further preferred that the engagement surface of the first supporting element is inclined with respect to the direction of displacement of the second supporting element and that it is preferably essentially congruent to an engagement surface of foot element. Thus, the engagement surface of the first supporting element is that surface which comes to engage with the foot element or contacts the same. The same applies to the engagement surface of the foot element. Here, the engagement surfaces are designed such that they are essentially congruent to each other, i.e. they have the same inclination in order to fix the foot element in the original position thereof. Particularly expediently, the engagement surfaces of the second supporting element are inclined with respect to each other such that they expand towards the outside. Particularly advantageously, they are inclined at an angle of about 10° to about 80°, particularly expediently about 45°, with respect to the longitudinal extension of the support unit.

In a further preferred embodiment, there is provided at least one engagement element on the first supporting element, which engagement element is adapted to come to engage with the compensating element. Thus, the engagement element serves to fix or fasten the compensating element so that swiveling or sweeping of the compensating element in the second position and third position, respectively, of the second supporting element may be prevented, which advantageously helps to avoid clattering noises during the travel operation.

Expediently, there are provided two engagement elements which are arranged at essentially opposite sides of the first supporting element. To put it differently, there is arranged one engagement element each at the front and at the rear or at the respective sides (i.e. right and left) of the first supporting element. In case the engagement elements are arranged at the sides, it is also advantageous that the compensating element may be additionally fixed in the transverse direction.

Preferably, in the second and/or third position of the second supporting element, the engagement element is in engagement with the compensating element. This ensures that both the foot element and the compensating element may be fixed in their (original) positions so that clattering noises may be prevented and wear may be reduced.

The rolling surface of the compensating element may comprise a recess at least in a certain region, which recess particularly expediently is formed in the region of or preferably centrally with respect to the central plane. Here, the recess may extend essentially circumferentially along at least a part of the rolling surface. As a matter of course, in addition to or instead of a recess, there may also be provided an opening or an aperture of the outer surrounding surface of the compensating element. The depth of the recess directed towards the swivel axis may be randomly dimensioned. However, particularly advantageously the depth of the recess directed towards the swivel axis essentially corresponds to the outer diameter of the spring provided as pre-tensioning device.

Accordingly, it is advantageous that the cross-sectional configuration of the recess essentially corresponds to the outer cross-sectional configuration of the pre-tensioning device provided in the form of a spring.

Expediently, the guiding portion comprises at least a guiding recess or a guiding notch for guiding engagement means of the compensating element. The guiding recess or the guiding notch may be designed as an aperture or a slot, for example. It can also be merely a depression in the material so that it becomes possible to guide the engagement means. The engagement means may be designed as a bolt, bar, journal or projection of any cross-sectional configuration. For example, the engagement means may have a round or angular cross-section. As a matter of course, the engagement means may be single-part and extend essentially over the entire width or transverse extension of the foot element (at least from the guiding notch of a first guiding portion to the guiding notch of an opposite guiding portion). Alternatively, the engagement means may also be multi-part and be arranged at (lateral) wall sections of the compensating element, from which they extend into the guiding notch or guiding recess. Expediently, the engagement means are releasably fastened to the compensating element, which ensures that they are easy to replace. The engagement means are in engagement with the guiding notch or guiding recess such that they are guided therein with clearance, wherein a guiding of the compensating element is ensured between the original position and the deflected position.

Advantageously, the recess or the guiding notch has a curved configuration, wherein the middle portion thereof is closest to the resting portion. The curved configuration of the guiding notch or guiding recess, for example in the side view (essentially parallel to the transverse axis of the foot element), may be V shaped, round or angular (i.e. polygonal). Due to the curved configuration, the middle portion of the guiding notch or guiding recess expediently is closest to the middle portion of the resting portion. Said middle portion, thus, corresponds to the placement of the engagement means of the compensating elements in the original position thereof. To put it differently, the apexes of the V-shaped guiding recesses or guiding notches are thus the lowest point and, in the original position of the compensating element, they are arranged essentially vertically below the swivel axis of the compensating element.

In a preferred embodiment, the foot element comprises a guiding device in order to guide the supporting element in the longitudinal direction, wherein the guiding device is designed as guiding portions arranged at either side of the supporting element, which guiding portions at least partially overlap with a distal end portion of the supporting element. The foot element comprises a guiding device for guiding the supporting element or the vehicle, respectively, in the longitudinal direction. Thus, the longitudinal direction corresponds to the direction of the positional offset of the vehicle or to the direction of displacement of the vehicle or of the second supporting element, respectively. Thus, by guiding the second supporting element in the longitudinal direction, a movement of the second supporting element in the transverse direction is reduced or prevented, respectively. To this end, the guiding device is formed from guiding portions arranged at either side of the second supporting element, which guiding portions overlap at least partially with a distal end portion of the second supporting element. Thus—seen in the longitudinal direction—the guiding portions are arranged adjacent to the second supporting element, i.e. particularly expediently they extend essentially parallel to the longitudinal direction of the foot element. Here, the guiding portions at least partially overlap in the vertical direction with a distal end portion of the second supporting element such that a distal end portion of the second supporting element at least in a certain region is arranged between the guiding portions and guided by them. The arrangement of the second supporting element between the guiding portions is such that in the transverse direction there is only little clearance of 10 mm at most, preferably 5 mm at most and particularly preferably 3 mm at most. In particular, the free ends of the guiding portions overlap with the distal end portion of the second supporting element at least partially. This makes it possible to support or transmit lateral forces to the foot element by contact of the distal end portion of the second supporting element with the free end of the guiding portions so that lateral forces are introduced into the foot element in the case of a transverse offset of the vehicle. As a result, it is ensured that lateral forces are no longer transmitted or only partially transmitted into the foot element via the swivel bearing and the compensating element, which reduces wear and increases the operational safety. Advantageously, in each position of the second supporting element, the guiding portions overlap at least partially with the distal end portion thereof. To put it differently, the guiding portions are designed such that the free ends thereof, in each position in the operational condition of the supporting foot, overlap at least partially in the vertical direction with the distal end portion of the second supporting element. As a result, it is possible to ensure that transverse forces are transmitted in the original position and in the deflected position of the supporting foot and in each position in between.

According to the invention there is further provided a method of actuating a supporting foot for vehicles, such as semi-trailers or the like, comprising the steps: displacing a second supporting element relative to a first supporting element from a first into a second position, and causing the first supporting element to engage with the foot element such that the foot element is braced between the first and the second supporting element.

Further advantages and features of the present invention become apparent from the following description of preferred embodiments with reference to the appended Figures, wherein individual features of the embodiments may be combined to new embodiments.

These and other advantages of the invention will be further understood and appreciated by those skilled in the art by reference to the following written specifications, claims and appended drawings.

BRIEF DESCRIPTION OF THE DRAWINGS

FIG. 4a is a side elevational view of a second embodiment of the supporting foot.

FIG. 4b is a perspective view of the supporting foot.

FIG. 5a is a side elevational view of a third embodiment of the supporting foot.

FIG. 5b is a perspective view of the supporting foot.

FIG. 6a is a side elevational view of a fourth embodiment of the supporting foot.

FIG. 6b is a perspective view of the supporting foot.

DETAILED DESCRIPTION OF PREFERRED EMBODIMENTS

Figure 1:
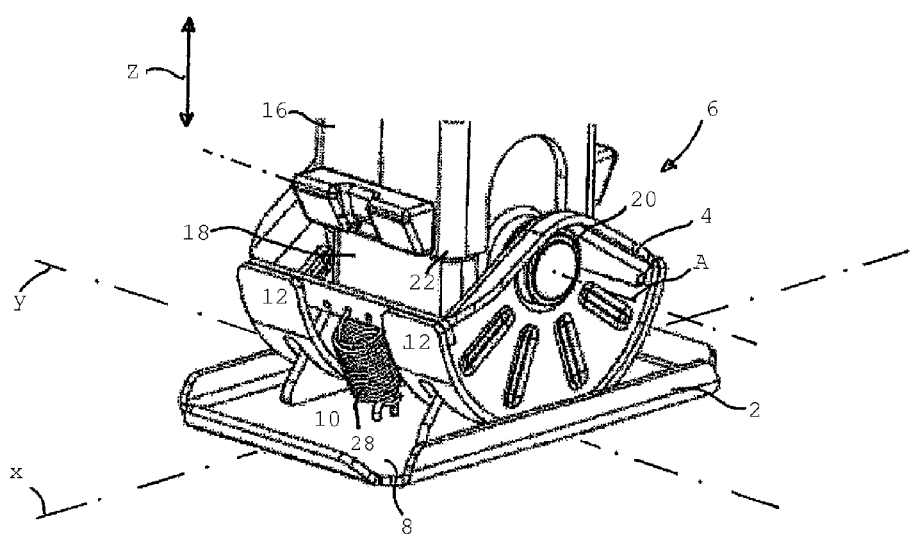
FIG. 1 is a perspective view of a first embodiment of the supporting foot according to the invention in the first position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

FIG. 1 is a perspective view of a preferred exemplary embodiment of the supporting foot according to the invention. The supporting foot comprises a foot element 2, a compensating element 4 as well as a support unit 6.

The foot element 2 is designed as an essentially plate-shaped body, the lower portion of which defines a resting portion 8 in order to be placed onto an underlying surface. The purpose of the rolling portion 10 provided on the upper surface of the resting portion 8 is to make sure that the compensating element 4 may be rolled along its rolling surfaces 12 essentially in the longitudinal direction or longitudinal extension X. The foot element 2 further comprises two guiding portions 14 (FIG. 2) spaced apart in the transverse direction Y, which guiding portions are designed as wall portions extending preferably essentially perpendicularly away from the rolling portion 10. As can be seen in particular from FIG. 3, the guiding portions 14 taper towards the free ends thereof.

Figure 2:
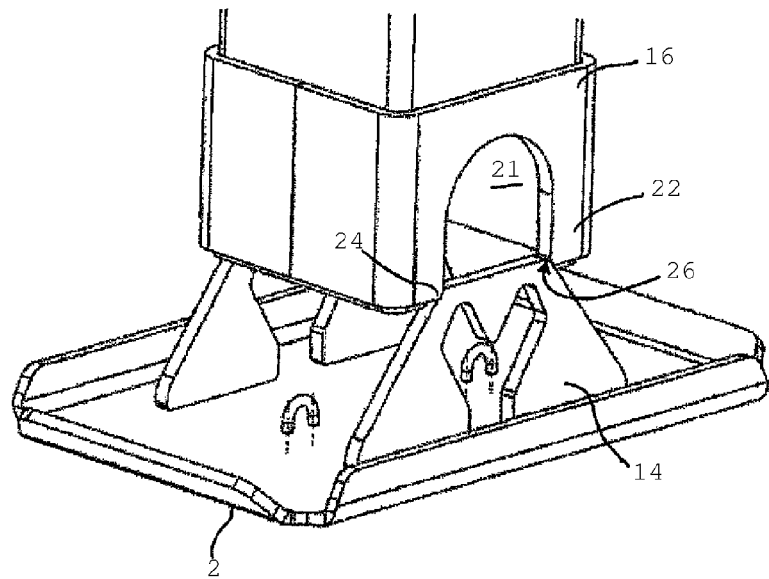
FIG. 2 is a perspective view of the first embodiment of the supporting foot according to the invention in the second position.
Figure 3:
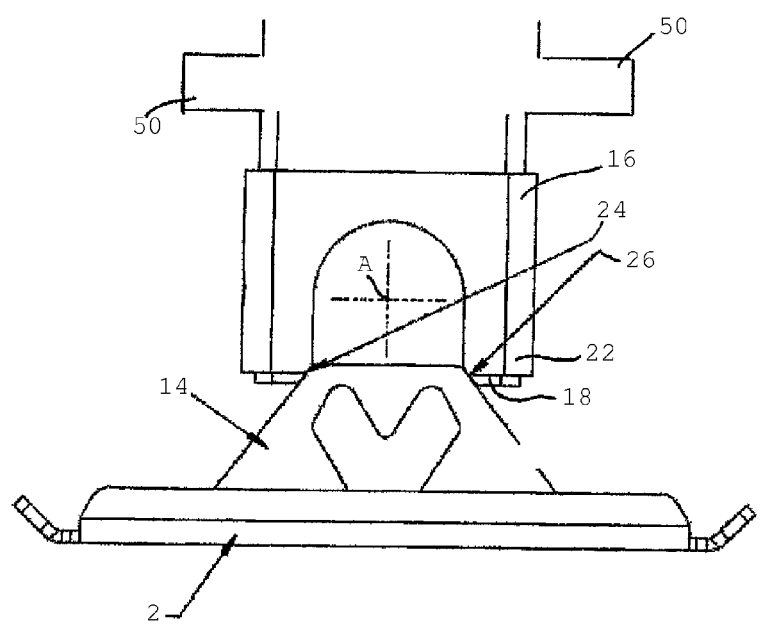
FIG. 3 is a front view of the first embodiment of the supporting foot according to the invention in the second position.

The support unit 6 is formed from at least a first supporting element 16 and a second supporting element 18 which are telescopic relative to each other. The first supporting 16 thus is expediently attached to a frame element 50 of the vehicle and, thus, its position relative to the vehicle is essentially not variable. The second supporting element 18 is movable relative to the first supporting element 16 in the displacement direction Z between a first position (FIG. 1) and a second position (FIGS. 2 and 3). To this end, the first supporting element 16 and the second supporting element 18 are advantageously concentric with respect to each other such that the second supporting element 18 can be slidingly fitted into the first supporting element 16. The first supporting 16 thus is expediently designed tube-shaped. The second supporting element 18 may also be designed tube-shaped. The cross-sections of the tubes may be randomly chosen, wherein rectangular cross-sections are preferred.

At a lower end of the second supporting element 18 the compensating element 4 is supported at the second supporting element 18 in such as manner that it can be swiveled or rotated about the swivel axis A via swivel bearings 20.

At a distal end portion 22 of the first supporting element 16 there are provided engagement surfaces 24 which come to engage with corresponding engagement surfaces 26 of the guiding portions 14 in the second position of the second supporting element 18 such that the foot element 2 is fixed or locked relative to the first supporting element 16.

The supporting foot according to the invention functions as follows: In the first position, the supporting foot according to the invention is capable of transmitting to the underlying surface forces introduced from the frame element 50 into the support unit 6 via the compensating element 4 and the foot element 2. During the travel operation, it is however necessary to move the supporting foot into a travel position, i.e. to space the foot element 2 as far apart from the underlying surface as is possible. To this end, the second supporting element 18 is retracted into the first supporting element 16 until the engagement surfaces 24 of the first supporting element 16 come into contact with the engagement surfaces 26 of the guiding portions 14 of the foot element 2 so that the foot element 2 is fixed to the first supporting element 16. A clattering noise caused by the foot element 2 during the travel operation is thus avoided. When the second supporting element 18 is further retracted into the first supporting element 16 into a third position (not shown), it is possible to bring the first supporting element 16 or partial portions thereof into contact with the compensating element 4 so that also the compensating element 4 is also fixed at the first supporting element 16. This is possible because a relative movement is possible between the foot element 2 and the compensating element 4 due to the connection via springs 28. As a result, a clattering noise due to relative movements both of the foot element 2 and the compensating element 4 is advantageously prevented.

The contact or engagement between the first supporting element 16 and the compensating element 4 may particularly expediently occur via engagement elements provided at a distal end portion 22 of the first supporting element 16, as they are shown in FIGS. 4a-6b. For example, the engagement elements may be provided at the front and at the rear—seen in the longitudinal direction—of the first supporting element 16. Here, the engagement elements are particularly advantageously designed such that they are resilient or elastic. For example, the engagement elements may be spring clips 30 (FIGS. 4a and 4b) or rubber elements 32 (FIGS. 5a and 5b). Additionally or alternatively, there may be provided engagement elements which are arranged at lateral wall portions of the distal end portion 22 of the first supporting element 16. Said engagement elements may be designed as spring clip or rubber element 34 (FIGS. 6a and 6b). Particularly preferably, the engagement elements are wedge-shaped. By arranging them in lateral portions, it is in addition expediently made possible to fix the compensating element 4 in the transverse direction Y.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A supporting foot for vehicles, comprising:
a foot element with a resting portion for resting on an underlying surface, and a compensating element for receiving a support unit and for compensating a positional offset of the support unit with regards to the foot element, wherein the support unit comprises a first supporting element and a second supporting element telescopingly coupled with the first supporting element,
the second supporting element is movable between a first and a second position with respect to the first supporting element, and
wherein the first supporting element, in the second position of the second supporting element, is in direct engagement with a guiding portion of the foot element, which guiding portion is designed as a wall portion extending substantially perpendicularly from at least one of a resting portion and a rolling portion thereof, such that the foot element is braced with the first supporting element.

2. The supporting foot according to claim 1, wherein the guiding portion tapers towards at least one free end thereof.

3. The supporting foot according to claim 2, wherein the first supporting element comprises a distal end portion which, in the second position, is in engagement with the foot element.

4. The supporting foot according to claim 1, wherein the foot element comprises a guiding device that guides the second supporting element in the longitudinal direction, and wherein the guiding device is formed from two guiding portions arranged at either side of the second supporting element, which guiding portions overlap at least partially with a distal end portion of the second supporting element.

5. The supporting foot according to claim 1, wherein the first supporting element comprises a distal end portion which, in the second position, is in engagement with the foot element.

6. The supporting foot according to claim 1, wherein the first supporting element comprises a notch at a distal end portion which is adapted, in the second position, to at least partially receive a swivel axis of the compensating element.

7. The supporting foot according to claim 1, wherein the second supporting element can further be moved into a third position relative to the first supporting element, in which third position the first supporting element can be made to engage with at least one of the compensating element and the swivel axis.

8. The supporting foot according to claim 1, wherein the engagement surface of the first supporting element is inclined relative to the direction of displacement of the second supporting element and is substantially congruent to an engagement surface of the foot element.

9. The supporting foot according to claim 1, wherein at least one engagement element is provided at the first supporting element, which engagement element is adapted to engage with the compensating element, and wherein the engagement element and includes at least one of a spring clip and a rubber element.

10. The supporting foot according to claim 1, wherein two engagement elements are provided which are arranged at essentially opposite sides of the first supporting element.

11. The supporting foot according to either one of claims 9 and 10, wherein the engagement element, in at least one of the second position and the third position, is in engagement with the compensating element.

12. The supporting foot according to claim 1, wherein the foot element comprises a guiding device that guides the second supporting element in the longitudinal direction, and wherein the guiding device is formed from two guiding portions arranged at either side of the second supporting element, which guiding portions overlap at least partially with a distal end portion of the second supporting element.

13. A supporting foot for vehicles, comprising:
a foot element with a resting portion for resting on an underlying surface, and a compensating element for receiving a support unit and for compensating a positional offset of the support unit with regards to the foot element, wherein the support unit comprises a first supporting element and a second supporting element telescopingly coupled with the first supporting element,
the second supporting element is movable between a first and a second position with respect to the first supporting element, and
wherein the first supporting element, in the second position of the second supporting element, is in direct engagement with a guiding portion of the foot element, which guiding portion is designed as a wall portion extending substantially perpendicularly from at least one of a resting portion and a rolling portion thereof, such that the foot element is braced with the first supporting element, and wherein the first supporting element comprises a notch at a distal end portion which is adapted, in the second position, to at least partially receive a swivel axis of the compensating element.

14. The supporting foot according to claim 13, wherein the second supporting element can further be moved into a third position relative to the first supporting element, in which third position the first supporting element can be made to engage with at least one of the compensating element and the swivel axis.

15. The supporting foot according to claim 14, wherein the engagement surface of the first supporting element is inclined relative to the direction of displacement of the second supporting element and is substantially congruent to an engagement surface of the foot element.

16. The supporting foot according to claim 15, wherein at least one engagement element is provided at the first supporting element, which engagement element is adapted to engage with the compensating element, and wherein the engagement element and includes at least one of a spring clip and a rubber element.

17. The supporting foot according to claim 16, wherein two engagement elements are provided which are arranged at essentially opposite sides of the first supporting element.

18. The supporting foot according to either one of claims 16 and 17, wherein the engagement element, in at least one of the second position and the third position, is in engagement with the compensating element.

19. A method of actuating a supporting foot for vehicles, comprising the steps:
- displacing a second supporting element relative to a first supporting element from a first position into a second position; and
- causing the first supporting element to directly engage with a guiding portion of the foot element, which guiding portion is designed as a wall portion extending substantially perpendicularly from a resting portion, such that the foot element is braced with the first supporting element.

* * * * *